Figure 1:
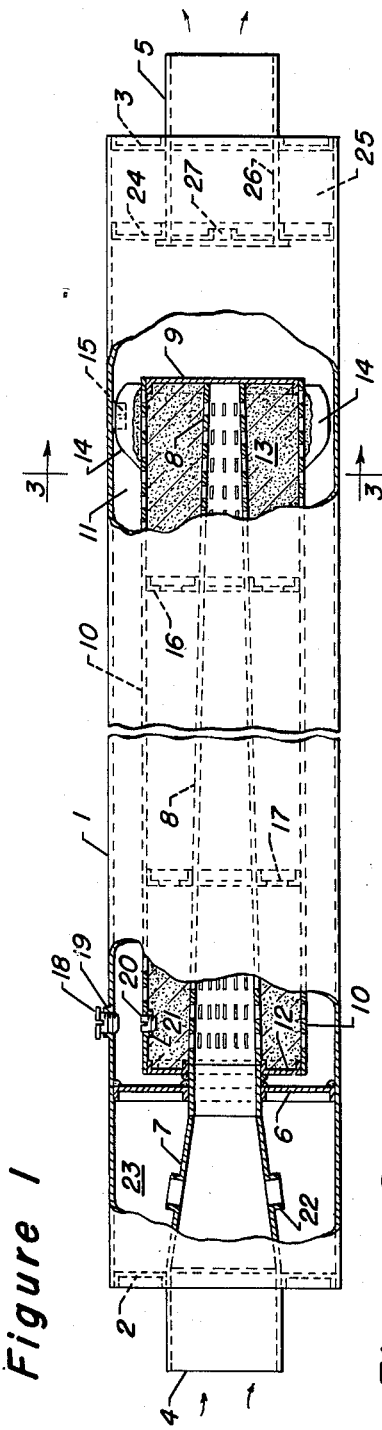

Oct. 27, 1964

F. V. PURSE 3,154,388

CONVERTER-MUFFLER

Filed Sept. 7, 1962

2 Sheets-Sheet 1

INVENTOR:
Frank V. Purse

BY:
James R. Hoatson Jr.
Philip T. Liggett
ATTORNEYS

Oct. 27, 1964  F. V. PURSE  3,154,388
CONVERTER-MUFFLER
Filed Sept. 7, 1962  2 Sheets-Sheet 2

INVENTOR:
Frank V. Purse

BY: James R. Hoatson Jr.
Philip T. Liggett
ATTORNEYS

United States Patent Office 3,154,388
Patented Oct. 27, 1964

3,154,388
CONVERTER-MUFFLER
Frank V. Purse, Northfield, Ill., assignor to Universal Oil
Products Company, Des Plaines, Ill., a corporation of
Delaware
Filed Sept. 7, 1962, Ser. No. 222,123
6 Claims. (Cl. 23—288)

The present invention relates to an improved form of converter-muffler containing a fixed bed of contact material for the treatment of engine exhaust gases. More particularly, the improved design provides for structural features within the internals of the unit that better accommodate unequal expansions from high temperature conditions, and in addition result in a tapering, non-uniform thickness to the bed of catalyst particles which effects better exhaust gas flow characteristics through the unit. This application is a continuation-in-part of my earlier application Serial No. 87,845, filed February 8, 1961, now abandoned.

The desirability of removing or converting the noxious compounds of vehicular exhaust gases has been generally well established as a means for overcoming smog in many geographical areas. In a catalytic operation, the hot gases issuing from the motor exhaust manifold are mixed with a quantity of secondary or combustion air and the resulting mixture passed through a catalyst bed maintained within a conversion zone so as to effect a more or less complete oxidation of carbon monoxide and unburned hydrocarbons present in the exhaust stream. The use of a catalytic method and apparatus also provides for the initiation of the oxidation reaction at lower temperatures than might otherwise be possible and effectively eliminates the need for igniting means which are generally used with most types of "afterburners" or other apparatus which depend strictly upon thermal conditions.

A preferred form of exhaust gas conversion apparatus embodies a design and construction which provides for the internal placement or positioning of a catalyst bed such that it may be utilized in an efficient manner and to maximum degree. It is not intended to limit the present invention to the use of any one type of catalyst since there are improved catalyst compositions available which will retain their catalytic efficiency for long periods of operation. The catalyst is used in particle form, such as small spheres, cylinders and/or pellets, and is disposed in a suitable catalyst retaining section providing for uniform flow therethrough.

It is a principal object of the present invention to provide a converter for engine exhaust gases which is designed and constructed to compensate for the velocity head in a gas stream flow and effect an improved flow and contact through the catalyst bed.

It is also an object of the present invention to provide for the use of a variable depth catalyst or contact bed which effects a greater pressure drop therethrough at the downstream end.

A still further object of the invention provides for the connecting and positioning of the internal catalyst retaining section within the unit in a manner which gives flexibility and a means for longitudinal expansion under high temperature conditions in order to eliminate warpage and rupture problems.

In one embodiment, the present invention provides a catalytic converter-muffler apparatus for treating an engine exhaust gas stream, which comprises in combination, an elongated cylindrical-form of outer housing having an exhaust gas port at each end thereof, an inner perforate tubular gas conducting member connecting with and extending axially from a gas port at one end of the housing through a major portion of the length of said housing, the tubular member having its interior end connecting with an interior non-perforate transverse end plate spaced from the opposite end of the housing and the gas port therethrough, an outer cylindrical-form perforate particle retaining member positioned around and spaced from the inner perforate member, said outer member being positioned coextensively and in a non-parallel manner with said inner tubular member to connect with the non-perforate end plate and thereby form an enclosed variable area cross section annular-form particle retaining section between the perforate members, end seal means between said perforate members at the end of the retaining section opposite said transverse end plate, subdivided particles retained within the variable area cross section particle retaining section around said inner perforate member, and said outer cylindrical-form perforate member being spaced from the inside of said outer housing to provide an open-ended annular form gas manifold section extending longitudinally inside of the outer housing in open communication with the exhaust gas port in the end of said housing spaced from the non-perforate end plate, whereby an exhaust gas stream may pass radially through said particles in the retaining section between perforate members as such stream passes from one end of said apparatus to the other end thereof.

Radial flow through an annular form of bed of catalyst or other subdivided contact material is of particular advantage in fluid-solids contacting in that it provides a substantially uniform flow through a relatively large surface area. However, where a relatively high velocity gaseous stream is introduced into a contact chamber and diverted through a straight cylindrically-shaped annular-form catalyst bed, there tends to be a non-uniform flow through such bed. As portions of the total gas flow through the bed, the velocity of the remaining gas in the inlet conduit is reduced which results in a decreasing velocity head and an increasing static head from the upstream to the downstream end of the inlet conduit. Conversely as portions of the total gas flow through the bed and into the outlet conduit the velocity of the accumulating gas in the outlet conduit increases which results in an increasing velocity head and a decreasing static head from the upstream to the downstream end of the outlet conduit. The resulting pressure gradients in the conduits, either singly or in combination, will cause an increasing static head differential across the bed when moving from the upstream to the downstream ends of the conduits. This differential static head gradient causes an increasing flow through the bed when moving from the upstream to the downstream end of the conduits. This inequality of flow becomes progressively worse as the total flow rate increases.

It is an advantage of the present design and construction to provide a catalyst bed in the shape of a tapering annulus which provides a greater particle bed depth at the downstream end of the unit such that there will be a greater pressure drop through the bed for a given mass flow rate which will tend to balance the differential static head gradient aforementioned, causing a decreased flow through the bed at the downstream end of the inlet conduit and a more uniform flow through the entire annular-form bed. It is not practicable to use means to obtain a uniform space velocity throughout an entire elongated catalyst bed for all flow rates of an exhaust gas stream from an auto engine, however, a preferred design of the converter, embodying a variable thickness to the elongated annular-form bed, tapers the bed such that for low flow rates there is a greater quantity of the total radial flow through the thinner upstream end portion of the catalyst section in order to initiate rapid ignition and oxidation of the exhaust stream at such upstream end. The tapering bed design will still permit a greater quantity of the radial flow to be effected through the downstream end portion of the elongated bed for high flow rates to the unit. In other words, there is a crossover point along the length of the tapering annular bed, with increasing thickness and pressure drop arranged to give a greater flow of engine exhaust gases to the thinner upstream end portion for low flow rate conditions to the unit.

Another feature of the improved converter design resides in effecting flexibility between the inner and outer perforate tubular members which retain the catalyst particles such that there may be differential expansion longitudinally between such members. At the same time provision is made for anchoring and effecting a fixed connection at one end of the elongated particle retaining section such that the inner perforate members may expand longitudinally with respect to the cooler outer housing of the unit to eliminate the warpage and breakage of the construction joints within the particle retaining section of the apparatus under high temperature operating conditions.

A preferred form of catalytic muffler apparatus also insures adequate muffling of the noise which may be created from an engine exhaust gas stream being brought into contact with the treating bed and subsequently released to the atmosphere. A preferred embodiment of the present improved catalytic converter design and construction includes one or more resonating chambers to assist in reducing the noise level within the converter apparatus, with such resonating chambers being located adjacent the exhaust gas port zones of the apparatus to effect the further advantage of serving as insulating chambers at each end of the catalyst section.

Thus, in a more specific embodiment, the catalytic converter-muffler apparatus for treating an engine exhaust gas stream comprises in combination, an elongated cylindrical form of outer housing having an exhaust gas port at each end thereof, an interior transverse partitioning plate spaced from one end of the housing and having a central gas passageway therethrough, a gas conducting member connecting between the adjacent gas port and said gas passageway of said partitioning plate, an inner perforate tubular member extending longitudinally from the partitioning plate and from the gas conducting member for a major portion of the inside length of the housing, a flexible non-perforate end closure plate connecting with and positioned transversely across the end of said perforate member at a spaced distance from the gas port in the opposing end of said housing, a flexible non-perforate catalyst retaining end seal member connecting with and extending radially from the periphery of the end of said inner perforate tubular member at a position closely adjacent said transverse partitioning plate, the outer periphery of said non-perforate end seal member spaced from and remaining clear of the inside wall of said outer housing and connecting with one end of an outer cylindrical-form perforate particle retaining member, such perforate outer member being spaced from and positioned in a non-parallel coextensive manner with said inner tubular perforate member to connect with said end closure plate, said outer perforate member thereby forming an enclosed variable area cross section annular-form particle retaining section with said inner perforate tubular member and said end plate and said end seal member, said outer perforate member also spaced from said outer housing and providing an open-ended outer annular-form gas manifold section extending longitudinally along the inside of said outer housing that is in open communication with said gas port in the end of said outer housing spaced from said non-perforate end closure plate, and subdivided particles retained within said variable area cross section particle retaining section between said perforate members whereby an exhaust gas stream may pass radially through said particles as the exhaust gas stream passes from one end of said apparatus to the other end thereof.

It is to be understood that the terminology "cylindrical," "annular-form," or "annular-shape," as used herein, embodies both circular and oval cross sections with respect to a tubular member or a zone between spaced tubular members, inasmuch as the present improved form of construction may apply to either the circular or oval form of housing and interior chambers. The exterior appearance of the improved converter-muffler will thus be similar to that of the present day cylindrical or oval-shaped mufflers and resonators in use with automobiles and trucks. Oval shapes are preferred for present day passenger automobiles in order to reduce the height of the converter and more readily permit installation on the vehicle without unduly interfering with necessary road clearances.

The design and construction of the present improved converter-muffler, as well as other advantageous features in connection therewith, are better set forth and explained by reference to the accompanying diagrammatic drawing and the following description thereof.

FIGURE 1 of the drawing is a sectional elevational view through one embodiment of an oval shaped converter-muffler adapted to retain a tapering catalyst bed of nonuniform thickness therein.

Figure 2:
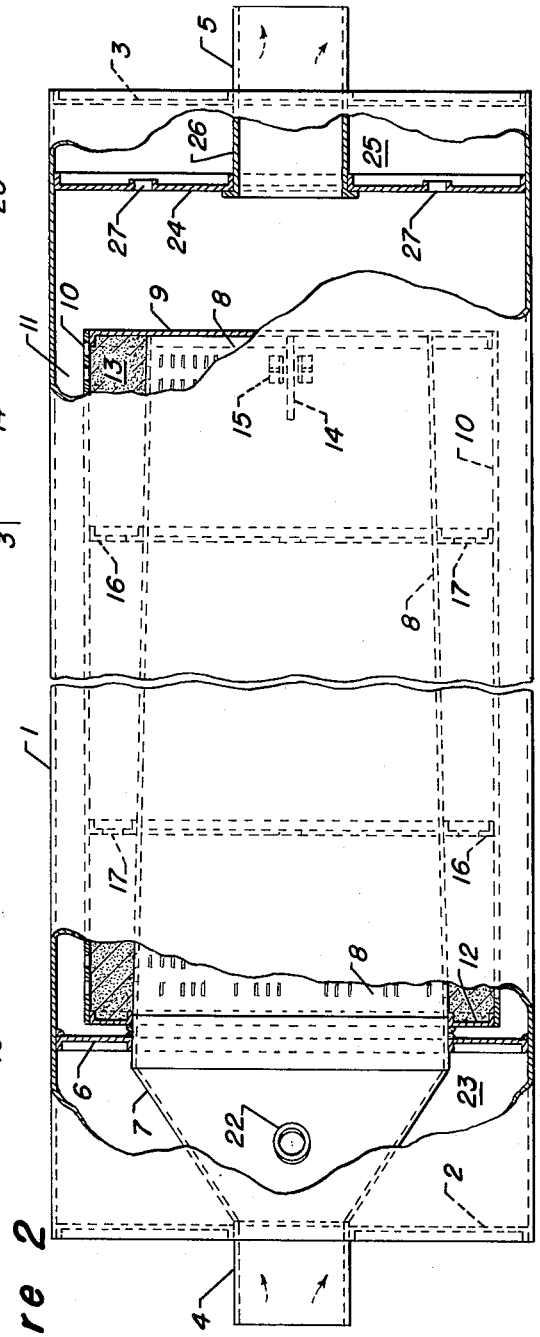

FIGURE 2 of the drawing is a plan view, partially in section, through the apparatus of FIGURE 1.

Figure 3:
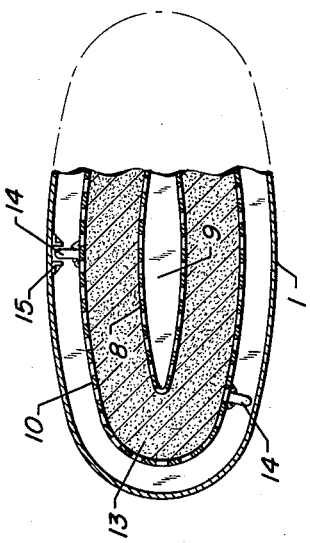

FIGURE 3 of the drawing is a partial cross sectional view through the apparatus, as indicated by line 3—3 in FIGURE 1, indicating the position of spacer ribs between the inner particle retaining section and the inside of the outer housing in order to provide sliding contact between the two.

Figure 4:
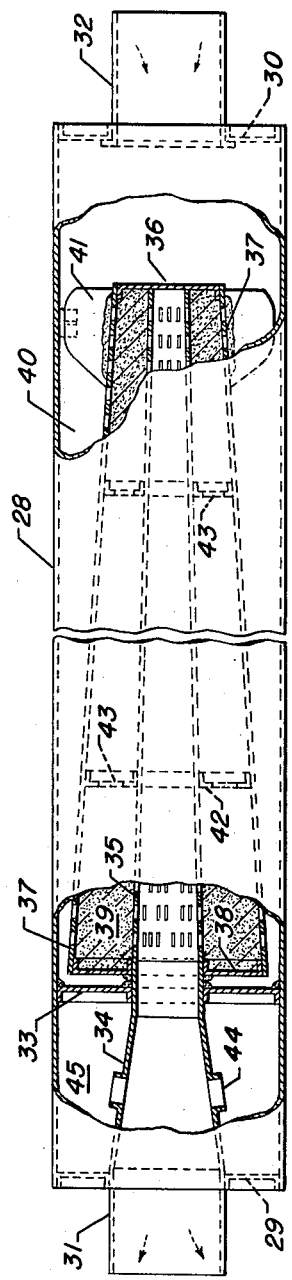

FIGURE 4 of the drawing is a sectional elevational view through a modified embodiment of the converter-muffler apparatus adapted to have exhaust gas flow radially inward to a centrally positioned gas collecting manifold.

Referring now particularly to FIGURES 1, 2 and 3 of the drawing, there is shown an oval shaped or outer housing 1 having end plates 2 and 3 which in turn have openings and short pipe sections providing exhaust gas ports 4 and 5 adapted to handle an exhaust gas stream flow from an engine. The present embodiment indicates port 4 as being a gas inlet to the apparatus while port 5 provides an exhaust gas outlet for the unit; however, it should be noted that a catalytic converter-muffler unit of this general design may accommodate the exhaust gas stream flow in the reverse direction. At one end of the interior of the housing 1 is provided a transverse partitioning member 6 with a central opening adapted to connect with a tapering circular to oval gas conducting transition section 7, in turn connecting with the gas port 4. The tapering transition member 7 thus conducts the exhaust gas stream from the latter port longitudinally into an elongated tapering perforate tubular member 8. The inner perforate member 8 extends longitudinally through a major portion of the interior length of housing 1 to connect with a transversely positioned non-perforate end closure plate 9. An outer perforate cylindrically-shaped particle retaining member 10 is spaced from the inner tubular member 8 and extends longitudinally in a coextensive manner to likewise connect with the non-perforate end plate 9. The perforate member 10 is also spaced inwardly from the inside wall of the housing 1 so as to provide an open-ended annular form of manifold section 11 that extends longitudinally along the inside of the housing. Adjacent the larger inlet end of the inner tubular member 8, there is provided an end seal-plate 12 which in turn provides an end seal means and closure for a catalyst or particle retaining section 13 which is of annular form between the two perforate members.

In accordance with the present invention, the perforate members 8 and 10 extend in a non-parallel manner such that there is a resulting variable cross sectional area catalyst retaining section 13 between the two plates. Also, it may be noted that to improve flow characteristics through the annular-form of particle bed, the downstream end of the catalyst retaining section shall be of a greater thickness, providing an increased radial flow bed depth at the downstream end of the section. In the present drawing, with the inlet port 4 providing for the introduction of the exhaust gas stream to the enlarged end of perforate tapering member 8, there is thus provided a greater spacing between perforate members 8 and 10 at the downstream end of the catalyst section 13, in the zone adjacent the end closure plate 9. The greater bed thickness at this end of the section in turn provides a greater pressure drop for the exhaust gas in its outward radial flow to in turn convert the velocity head effect into static pressure and force more gas flow through the upstream end portion of tubular member 8 in the manner hereinbefore described, with a resulting greater flow through the thinner portion of the bed of catalyst in section 13. Although not necessarily clearly shown in the drawing, it should be further noted that the smaller end portion of the tapering inner member 8, when used for an outward radial flow of gases, may be provided with a lesser number of perforations than exists in the upstream end portion thereof, which also results in an increased pressure drop and a reduction in the gas flow through the downstream end of the catalyst bed and greater uniformity of the radial flow throughout the entire length of the catalyst section.

In order to accommodate internal longitudinal expansions under high temperature conditions, a preferred design of the unit effects a fixed and sealed connection of the transverse partitioning member 6 at the zone of the inlet wall of tapered perforate member 8 and with the inside of the wall of housing 1. In addition, the end seal member 12 is fixedly connected to the periphery of the end of member 8 at a short spaced distance from the member 6, however, there is no connection of the outer periphery of the seal member 12 with the transverse member 6 or with the inside of the housing 1, such that there is flexibility in the end seal plate 12 which can accommodate, in conjunction with end plate 9, the differential expansion between the inner tubular member 8 and the outer perforate tubular member 10. After the converter is placed in use to receive an exhaust gas stream, there will generally be a higher temperature along the length of inner tubular member 8 than in the outer tubular member 10, such that the longitudinal expansion of the latter will be slightly less than that of the inner member 8, and such differential expansion accommodated by a slight flexure in the two end closure plates 9 and 12. The latter plates are preferably fabricated from relatively thin gauge non-rigid material in order to be flexible. In the overall longitudinal expansion of both members 8 and 10 from the fixed connection at the upstream end of tubular member 8, and at the zone of transverse plates 6 and 12, there will be a substantial movement of the downstream end of the outer perforate plate 10 and of the end plate 9, as compared with the inside of the wall of housing 1. Thus, in order to maintain a suitable sliding contact and the proper positioning for the particle retaining section, there are suitable spacers or "shoe" members 14, as best shown in FIGURES 1 and 3, which provide for centering the inner perforate members in the apparatus and at the same time permitting a sliding contact with the inside surface of the housing 1. Such spacer members 14 are preferably narrow rib-like pieces that are welded or otherwise attached to the exterior end portion of the perforate member 10 such that gas flow from the manifold section 11 will not be interfered with. Where it is deemed desirable one or more pairs of short guide clips or angle members 15 may be attached to the inside of the wall of the housing 1 in a manner to straddle the one or more spacer members 14 and preclude lateral movement between the inner catalyst retaining section and the housing 1.

The longitudinally extending perforate tubular members 8 and 10 may be formed of light weight alloy sheets, of say 22 gage stock, so that in a preferred design, they are strengthened and stiffened by suitably spaced rib-plates or diaphragms 16 that in turn are positioned transversely between the tubular members in a fixed manner and at predetermined longitudinal spacings. In order to insure particle bed continuity and heat travel through the annular-form catalyst section 13, as well as to permit the filling of the catalyst retaining section with subdivided particles from a single fill-plug, there are provided spaced openings 17 in the plurality of spaced plates 16. A fill-plug arrangement is indicated diagrammatically along the upper face of the unit, with a fill-plug 18 threadedly inserted in an interiorly threaded bushing or shoulder member 19 passing through the wall of the outer housing 1, while in alignment therewith there is an inner threaded plug 20 removably positioned in a threaded bushing or shoulder portion 21 in the upper wall portion of the perforate outer member 10. Thus, subdivided catalyst particles may be added or removed and replaced within the catalyst retaining section 13 after assembly of the converter-muffler apparatus.

Another feature of the present improved construction and design of the converter unit is the provision of resonating chambers at each interior end of the housing. Spaced openings 22 in the wall of the tapering conduit 7 permit the flow of exhaust gas into a trapped or "dead-ended" zone 23 which encompasses the conduit member 7 between the transverse partition plate 6 and the end plate 2 of the housing. In other words, the openings 22 permit exhaust gas flow and communication with a resulting hot gas filled zone at the end of the housing to in turn provide a resonating or echo chamber for a desired muffling effect on the exhaust gas stream. At the opposing end of the housing, a transverse partition plate 24, with an open central portion, is spaced from end plate 3 to provide a trapped zone 25 around a non-perforate portion of conduit 26 extending between exhaust gas port 5 and the manifold section 11 of the apparatus. Additional side positioned gas passageway openings 27 provide for the introduction of the exhaust gas stream into the trapped zone 25 to serve as a resonating or echo chamber at the downstream end of the unit. It may be further noted that the gas filled resonating chambers 23 and 25 will serve as insulating chambers between the end of the housing 1 and the ends of the interiorly positioned catalyst bed whereby a maximum heat is retained within the unit.

In the embodiment of FIGURES 1 and 2, it may be noted that the outer perforate member 10 is indicated as a non-tapering oval-shaped section and that by virtue of the inner perforate tubular member 8 tapering in two directions at a predetermined slope, there is provided a variable cross-sectional area catalyst retaining section 13 which is of uniform radial depth at any given cross section therethrough. This, of course, results in a uniform peripheral flow through the annular-form catalyst bed at any given longitudinal point through the unit. At the same time, a uniform longitudinal flow is obtained by virtue of the heretofore described varying thickness to the bed in the long direction to compensate for the effect of the velocity head of the exhaust gas stream being introduced to the interior of the unit. In a modified arrangement, however, the outer perforate member 10 need not be of uniform cross section. In other words, outer member 10 may be tapered and still provide a non-parallel spaced relationship with respect to the tapering of the inner member 8, to result in a varying cross-sectional area in the annular-form of catalyst retaining section. In still another embodiment, the inner tubular member 8 may be substantially of uniform diameter, or cross section, throughout its length, while the outer perforate member tapers to provide a non-parallel cylindrical or oval-form tubular member spaced around the inner member and a resulting tapering variable area cross-section catalyst retaining section between the perforate members.

Referring now to FIGURE 4 of the drawing there is indicated a modified embodiment of the converter-muffler apparatus which retains the improved design features, including the variable area cross section longitudinally through the catalyst retaining section of the unit. In a construction similar to that previously described, there is an outer cylindrical or oval-form of outer housing 28 which in turn is provided with end plates 29 and 30. A transverse partition plate 33 with a central opening therethrough is positioned at a spaced distance from end plate 29 in order to provide room for a tapering, circular to oval, gas conducting member 34 extending between transverse plate 33 and a port in end plate 29. The end plates 29 and 30 are provided, respectively, with suitable exhaust gas ports 31 and 32. In the present embodiment, there is indicated an exhaust gas stream inlet through port 32 and a treated gas outlet through port 31.

Extending axially and longitudinally from the central opening of partition plate 33 and from the end of gas conducting member 34, there is a perforate tubular member 35 terminating at a non-perforate end closure member 36. Such perforate member 35 extends for a major portion of the interior length of housing 28; however, it terminates at the end closure plate 36, which in turn shall be at a spaced distance from end plate 30 so as to provide a gas passageway zone therebetween.

Surrounding and spaced from the inner perforate member 35 is a tapering member 37 which is coextensive but non-parallel with the inner member 35. The smaller end of member 37 connects with the exterior periphery of the end closure plate 36 while at the other end, the outer member 37 connects with the periphery of an end seal member 38. The latter extends transversely or radially from the outer periphery of the inner tubular member 35, at a point relatively close to the transverse partitioning plate 33, so as to provide an end seal and closure member for a particle retaining section 39 of a tapering annular-form between inner tubular member 35 and the outer perforate member 37.

In accordance with the improved design of the present invention, the particle retaining section 39 has a uniform peripheral spacing and flow, but is of a tapering non-uniform thickness in the longitudinal direction, such that the downstream end of the catalyst retaining section is of a greater depth, whereby the particle bed therein will provide a greater flow resistance or pressure drop with respect to exhaust gas stream flow. The lesser particle bed depth adjacent the end closure plate 36 and a greater depth adjacent the end seal member 38 is, of course adapted to accommodate an exhaust gas flow entering from end port 32 and passing radially inward from the open-ended outer manifold section 40 which results from the spacing of perforate plate 37 inwardly from the inside wall of the housing 28. The radially inward gas flow through catalyst or particles in tapering section 39 to the interior of the inner perforate tubular member 35 provides that the latter serve as a treated gas manifold section, such that the gas stream is subsequently discharged through the tapering gas conducting member 34 and exhaust gas port 31.

A particularly advantageous feature of the present improved design is obtained through the use of the tapering outer perforate member 37 and the resulting tapering outer manifold section 40 such that the effects of the velocity head of the exhaust stream is minimized as it passes downstream into a reducing cross sectional area manifold section and into the particle bed. The reduction in the cross sectional area of the inlet manifold, together with the reverse situation in the gas collection section on the interior of perforate member 35, provides for a substantially uniform flow or "driving force" across the catalyst bed at any one point. In an optional feature, the greater circumference downstream end of perforate member 37 may be provided with a lesser number of perforations than exists in the upstream end portion to effect an increased pressure drop and a reduction in gas flow through the downstream end of the particle bed and a greater uniformity of inward radial flow throughout the entire length of the tapering bed. Obtaining a uniform space velocity through the catalyst bed requires that the amount of gas diverted through the bed be directly proportional to the bed length measured from the inlet end and this is partially fulfilled by having the manifold section 40 tapering from the upstream end to the downstream end as shown. This advantageous design and construction feature also operates in combination with the benefits obtained by the optional feature of utilizing lesser downstream perforations and the principal design feature of a longitudinally variable cross sectional area to the catalyst retaining section whereby there is a greater pressure drop at the downstream end of the unit to overcome velocity head effects and result in effecting a more uniform equalized flow throughout the entire length of the annular-form section. As with the prior embodiment, the downstream increased pressure drop should be sufficient to insure a greater gas flow through the thinner upstream portion of the elongated annular bed for low flow rates through the unit.

Also, as in the apparatus of FIGURE 1, the present modified embodiment of the converter provides for the longitudinal expansion of the inner perforate members 35 and 37 with respect to the inside wall of the outer housing 28, as well as between the perforate members themselves by virtue of flexibility in the end closure members 36 and 38. The inner periphery of the end seal member 38 is fixed by welding or other sealing connection to the outer end portion of tubular member 35 while the outer periphery of plate 38 and the end of the perforate member 37 is maintained free of the fixed partitioning member 33 and the inside wall of housing 38. Thus, there may be flexure and movement of the outer member 37 with respect to the inner member 35, as well as movement with respect to the outer housing 28. By reason of the fixity maintained at the end of the catalyst retaining section 39 at the zone of seal member 38, there is longitudinal expansion from this point to that of maximum movement at the zone of the end closure plate 36. Spaced rib-like members 41 are utilized to properly space and position the free end of the inner perforate members 35 and 37 in the interior of the housing 28 and at the same time permit a sliding contact with the inside wall thereof. In the manner of the previously described embodiment, the spacer members 41 may be positioned at spaced points around the periphery of the outer perforate member 37, but preferably they are narrow so as not to obstruct the longitudinal gas flow from an exhaust gas port 32 to the open-ended manifold section 40. Thus, such members 41 may be positioned similarly to that set forth for the members 14 in FIGURE 3 of the drawing, and where desired, suitable guide members may be employed along the inside of the housing 28 to insure proper radial or peripheral positioning.

To provide stiffness and rigidity to the elongated tubular members 35 and 37 and for the catalyst section 39 as a unit, there are provided a plurality of spaced partition plates 42 which in turn have openings 43 to permit the free passage of particulated material longitudinally through the annular-form section. Such partitions may be spot-welded, riveted, or otherwise connected between the spaced perforate plates to effect the desired reinforcement and rigidity in the unit.

Also, at one interior end of the present apparatus embodiment there is provided an echo or resonating chamber to permit the hot gases to flow into a trapped section.

In other words, suitable openings 44 in the tapering gas conduit 34 provide for the introduction of hot gases into a trapped section 45, extending between partitioning plate 33 and the end plate 29. Although not shown in the present drawing, an additional trapped resonating chamber may be positioned adjacent end plate 30 in a manner similar to that set forth in the embodiment of FIGURES 1 and 2. The use of the one or more spaced resonating chambers is, of course, optional within the improved converter-muffler design covered by the present invention. However, the use of resonating chambers which trap hot gases at the ends of each unit has a beneficial effect in providing insulating zones between the central catalyst retaining section 39 and the ends of the housing whereby a maximum of heat is retained internally within the converter apparatus.

It is also within the scope of the present improved design and construction to provide for covering the outer cylindrical or oval housing and end members with a suitable insulating material such as asbestos, mineral wool, or the like, in order to maintain the maximum amount of exothermic heat effect within the catalyst section. Such insulating materials may in turn be encased within a suitable weatherproofed casing which has the general shape or configuration of the outer housing.

It may be understood that various minor modifications in the design and/or location of various portions of the apparatus may be made within the scope of the present invention. As for example, there may be variations in the shape and spacing of partitioning members from that indicated in the drawing, or in the location and design of the fill-plug arrangement to the interior catalyst retaining section, as well as with respect to the sizing and positioning of various openings for the gas flow through various partitioning and stiffening members.

The perforations in the catalyst retaining shell will, of course, be sized in relation to the size of the catalyst particles which are to be maintained within the apparatus. The physical shape of the catalyst particles may be such that they are in the form of spheres, cylinders or pellets, typically having a dimension of 1/16-inch to about 1/4-inch, although particles of larger or smaller dimensions may be employed, where desirable. Mixed sizes of catalyst may well be utilized. However, in loading the catalyst, care should be taken to be sure that the catalyst particles are uniformly packed in all portions of the bed to provide substantially uniform resistance to the gas flow therethrough. As indicated hereinbefore, it is not intended to limit the present invention to any one type of catalyst, but suitable oxidation catalysts include the metals of Groups I, V, VI and VIII of the Periodic Table particularly copper, silver, vanadium, chromium, iron, cobalt, nickel and platinum. These components may be used singly, in combination with two or more, or may be composited with an inorganic refractory oxide such as alumina, silica-alumina, silica-alumina-zirconia, silica-thoria, silica-boria and the like.

I claim as my invention:

1. A catalytic converter-muffler apparatus for treating an engine exhaust gas stream comprising in combination, an elongated outer housing having an exhaust gas port at each end thereof, an inner perforate tubular gas conducting member having one end thereof connected with and extending from a gas port at one end of said housing axially through a major portion of the length of said housing, said tubular member having its interior end connecting with an interior non-perforate transverse end plate spaced from the opposite end of said housing and the gas port therethrough, said tubular member having a continuous uninterrupted taper from said one end to said interior end thereof, an outer perforate catalyst retaining member positioned around and spaced from said inner perforate member, said outer member being positioned coextensively and in a non-parallel manner with said inner tubular member to connect with said non-perforate end plate in a manner to form between said perforate members an enclosed variable area cross section annular-form particle retaining section having its greatest cross-section around the smallest end portion of said inner perforate member, end seal means between said perforate members at the end of said retaining section opposite said interior end plate, subdivided particles retained within said variable area cross section particle retaining section around said inner perforate member, and said outer perforate member spaced from the inside of said outer housing providing an annular-form gas manifold section extending longitudinally inside of said outer housing, with said manifold section having an open end portion thereof in open communication with the exhaust gas port in the end of said outer housing spaced from said non-perforate end plate whereby an exhaust gas stream may pass radially through said particles in said retaining section between said perforate members as such stream passes from one end of said apparatus to the other end thereof.

2. The apparatus of claim 1 further characterized in that said outer perforate member is of a substantially uniform cross section throughout its length.

3. The apparatus of claim 1 further characterized in that the end of said inner perforate tubular member connected with said exhaust gas port of said housing is held in a substantially fixed connection to the interior of said housing, while the opposing interior end of said inner perforate tubular member and said end plate connecting between such member and said outer perforate member has a plurality of spacer means positioned at spaced point therearound to provide sliding contact with the inside wall of said outer housing of said apparatus.

4. A catalytic converter-muffler apparatus for treating an engine exhaust gas stream comprising in combination, an elongated outer housing having an exhaust gas port at each end thereof, an interior transverse partitioning plate spaced from one end of said housing and having a central gas passageway therethrough, a gas conducting member connecting between the adjacent gas port and said gas passageway of said partitioning plate, an inner perforate tubular member extending longitudinally from said partitioning plate and from said gas conducting member for a major portion of the inside length of said housing and having a continuous uninterrupted taper from one end to the opposite end thereof, a flexible non-perforate end closure plate connecting with and positioned transversely across said opposite end of said perforate member at a spaced distance from the gas port in the opposing end of said housing, a flexible non-perforate catalyst retaining end seal member connecting with and extending radially from the periphery of said one end of said inner perforate tubular member at a position closely adjacent said partitioning plate, with the outer periphery of said non-perforate end seal member spaced from and remaining clear of the inside wall of said outer housing and connecting with one end of an outer perforate particle retaining member, the last-named member being spaced from and positioned in a non-parallel coextensive manner with said inner tubular perforate member to connect with said end closure plate and form an enclosed variable area cross section particle retaining section with said inner perforate tubular member and said end plate and said end seal member, said retaining section having its greatest cross-section around the smallest end of said inner tubular member, said outer perforate member also providing an outer gas manifold section extending longitudinally along the inside of said outer housing, with said outer manifold section having an open end portion in open communication with said gas port in the end of said outer housing spaced from said non-perforate end closure plate, and subdivided particles retained within said variable area cross section particle retaining section between said perforate members whereby an exhaust gas stream may pass radially through said catalyst particles as the exhaust gas stream passes from one end of said apparatus to the other end thereof.

5. The apparatus of claim 4 further characterized in that said gas conducting member between an end exhaust gas port and said partitioning plate is provided with gas passageway means whereby exhaust gases may enter the trapped section between the partitioning plate and the end of said housing, an additional transverse partitioning plate with a central gas passageway opening therethrough is provided at a spaced distance from the opposing end of said housing and said gas port therein, a non-perforate gas conduit connects between said adjacent gas port and said central gas passageway opening in said plate, and additional gas passageway means are provided through said spaced partitioning plate permitting gas flow to the trapped section between the latter and the end of said housing around said non-perforate gas conduit.

6. The apparatus of claim 4 further characterized in that the end of said inner perforate tubular member connected with said exhaust gas port of said housing is held in a substantially fixed connection to the interior of said housing, while the opposing interior end of said inner perforate tubular member and said end plate connecting between such member and said outer perforate member has a plurality of spacer means positioned at spaced points therearound to provide sliding contact with the inside wall of said outer housing of said apparatus.

References Cited in the file of this patent

UNITED STATES PATENTS

| | | |
|---|---|---|
| 1,465,904 | Herdle | Aug. 21, 1923 |
| 2,131,001 | Prochnow | Sept. 20, 1938 |
| 2,185,584 | Boyce | Jan. 2, 1940 |
| 2,329,847 | McCausland | Sept. 21, 1943 |
| 2,614,033 | Cornell et al. | Oct. 14, 1952 |
| 2,635,989 | Bonner | Apr. 21, 1953 |
| 2,639,224 | McAfee | May 19, 1953 |
| 2,928,492 | Nelson | Mar. 15, 1960 |
| 2,956,865 | Williams | Oct. 18, 1960 |
| 3,041,149 | Houdry | June 26, 1962 |